United States Patent
Ravichandran et al.

(10) Patent No.: US 12,128,875 B2
(45) Date of Patent: Oct. 29, 2024

(54) SYSTEM AND METHOD FOR COORDINATING DISCONNECT CLUTCH AND ELECTRIC MACHINE TORQUE

(71) Applicant: Ford Global Technologies, LLC, Dearborn, MI (US)

(72) Inventors: Maruthi Ravichandran, Dearborn, MI (US); Ravi Kumar Tumu, Westland, MI (US); Kevin Ruybal, Canton, MI (US); Justin Panhans, Detroit, MI (US); Fazal U. Syed, Canton, MI (US); Mary Catherine Farmer, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 227 days.

(21) Appl. No.: 17/937,912

(22) Filed: Oct. 4, 2022

(65) Prior Publication Data
US 2024/0109530 A1   Apr. 4, 2024

(51) Int. Cl.
*B60W 20/40* (2016.01)
*B60W 10/02* (2006.01)
*B60W 10/06* (2006.01)
*B60W 10/08* (2006.01)
B60K 6/387 (2007.10)

(52) U.S. Cl.
CPC ............ *B60W 20/40* (2013.01); *B60W 10/02* (2013.01); *B60W 10/06* (2013.01); *B60W 10/08* (2013.01); *B60W 2510/0652* (2013.01); *B60W 2510/0657* (2013.01); *B60W 2510/083* (2013.01); *B60W 2710/027* (2013.01); *B60W 2710/0666* (2013.01); *B60W 2710/083* (2013.01)

(58) Field of Classification Search
CPC ...... B60W 20/40; B60W 10/02; B60W 10/06; B60W 10/08; B60K 6/387; Y02T 10/62
See application file for complete search history.

(56) References Cited

U.S. PATENT DOCUMENTS

| | | | |
|---|---|---|---|
| 7,874,956 B2 | 1/2011 | Kouno | |
| 2009/0124450 A1* | 5/2009 | Silveri | B60K 6/38 903/912 |
| 2013/0296111 A1 | 11/2013 | Nedorezov et al. | |
| 2014/0041628 A1* | 2/2014 | Yoshizaki | F02D 37/02 123/402 |
| 2016/0236677 A1 | 8/2016 | Doering et al. | |
| 2018/0086208 A1* | 3/2018 | Hodgson | B60L 3/104 |
| 2019/0232941 A1 | 8/2019 | Wang et al. | |
| 2020/0331455 A1* | 10/2020 | Meyer | B60K 6/52 |

* cited by examiner

*Primary Examiner* — Tan Q Nguyen
(74) *Attorney, Agent, or Firm* — David Kelley; McCoy Russell LLP

(57) ABSTRACT

Systems and methods for operating a driveline of a hybrid vehicle are presented. In one example, torque capacity of a driveline disconnect is coordinated with torque control of an electric machine immediately following engine starting. The electric machine and the driveline disconnect clutch may assist starting of an engine, or alternatively, the engine may be started via a starter motor.

20 Claims, 4 Drawing Sheets

SYSTEM AND METHOD FOR COORDINATING DISCONNECT CLUTCH AND ELECTRIC MACHINE TORQUE

FIELD

The present description relates to methods and a system for starting an internal combustion engine of a hybrid vehicle.

BACKGROUND AND SUMMARY

A hybrid vehicle may experience "jerk" from time to time during operation. Jerk may be described as a noticeable change in driveline torque that does not conform to a smooth progression of torque through the driveline. For example, jerk may be experienced when driveline torque increases and then decreases shortly thereafter. Alternatively, jerk may be experienced when driveline torque decreases and then increases shortly thereafter. The torque changes in driveline torque that result in jerk may occur at higher frequency than changes in requested driveline torque and jerk may degrade vehicle drivability.

The inventors herein have recognized the above-mentioned issue and have developed a method for operating a vehicle, comprising: via one or more controllers, generating a rate limited driver demand torque in response to an engine start request; cranking an engine via increasing a torque transfer capacity of a driveline disconnect clutch and increasing a torque output of an electric machine as the torque transfer capacity of the driveline disconnect clutch is increased; and decreasing the torque transfer capacity of the driveline disconnect clutch and outputting a substantially constant torque via the electric machine in response to an indication of combustion occurring in the engine.

By generating a rate limited driver demand torque in response to an engine start request and cranking an engine via increasing a torque transfer capacity of a driveline disconnect clutch and increasing a torque output of an electric machine as the torque transfer capacity of the driveline disconnect clutch is increased, it may be possible to reduce a possibility of driveline jerk. Further, by decreasing the torque transfer capacity of the driveline disconnect clutch and outputting a substantially constant torque via an electric machine in response to an indication of combustion occurring in an engine, the possibility of driveline jerk may be reduced. In particular, the possibility of jerk may be reduced via rate limiting (e.g., restricting a rate of change of a control variable to less than a threshold rate of change in the control variable) the driver demand torque so that electric machine torque progresses smoothly whether the driver demand torque is increasing or decreasing. During conditions where the engine is being started, the electric machine torque may be held or maintained steady while torque capacity of the driveline disconnect clutch is decreased so that driveline torque follows a rate limited trajectory. Commanding the electric machine to a constant value may prevent torque control of the electric machine from interfering with torque control of the driveline disconnect clutch, which may allow driveline torque to follow a rate limited trajectory, thereby smoothing torque progression through the driveline.

The present description may provide several advantages. In particular, the approach may reduce driveline torque disturbances. Further, the approach may reduce complexity of driveline disconnect clutch torque capacity control. Additionally, the approach may improve a vehicle's drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
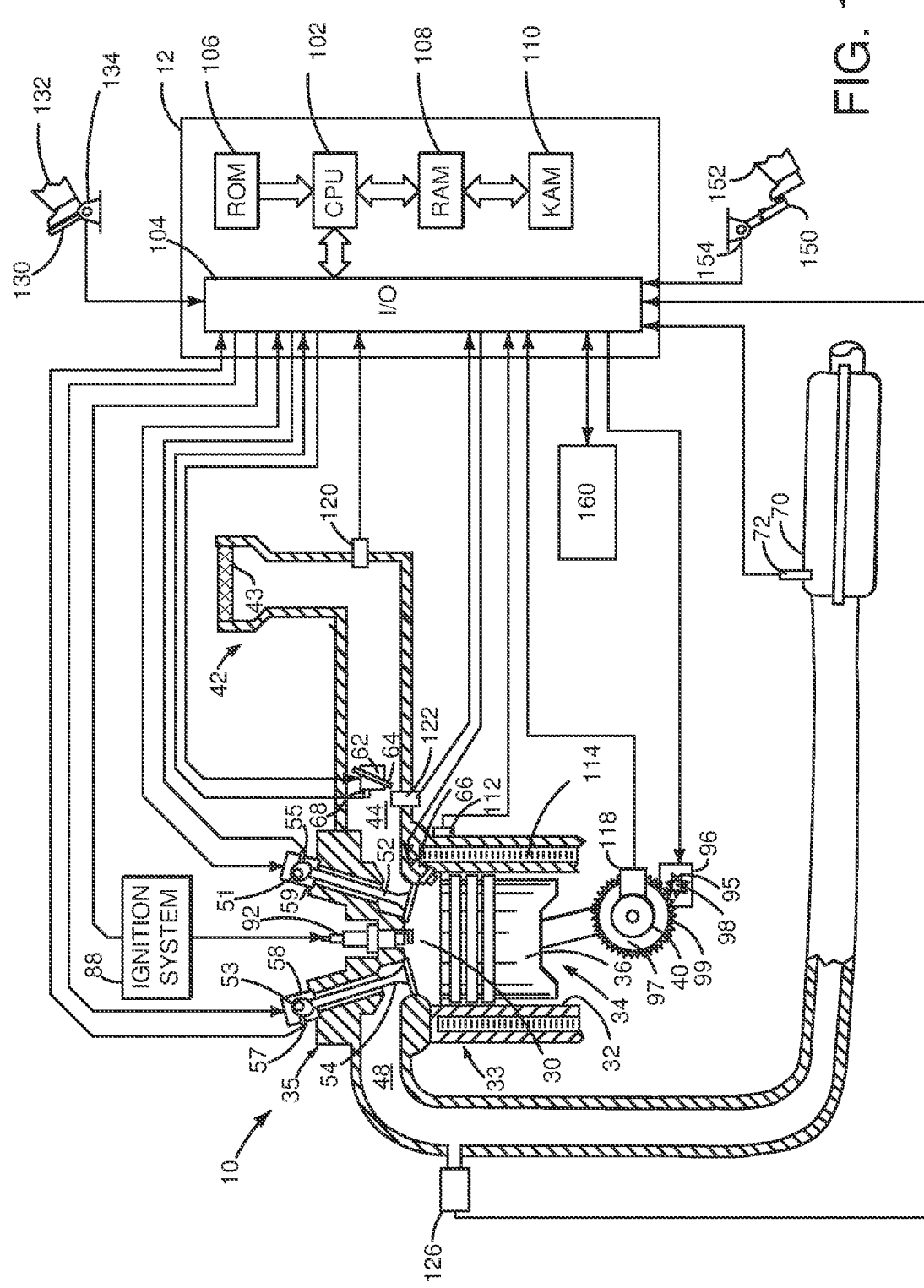
FIG. 1 is a schematic diagram of an engine.
Figure 2:
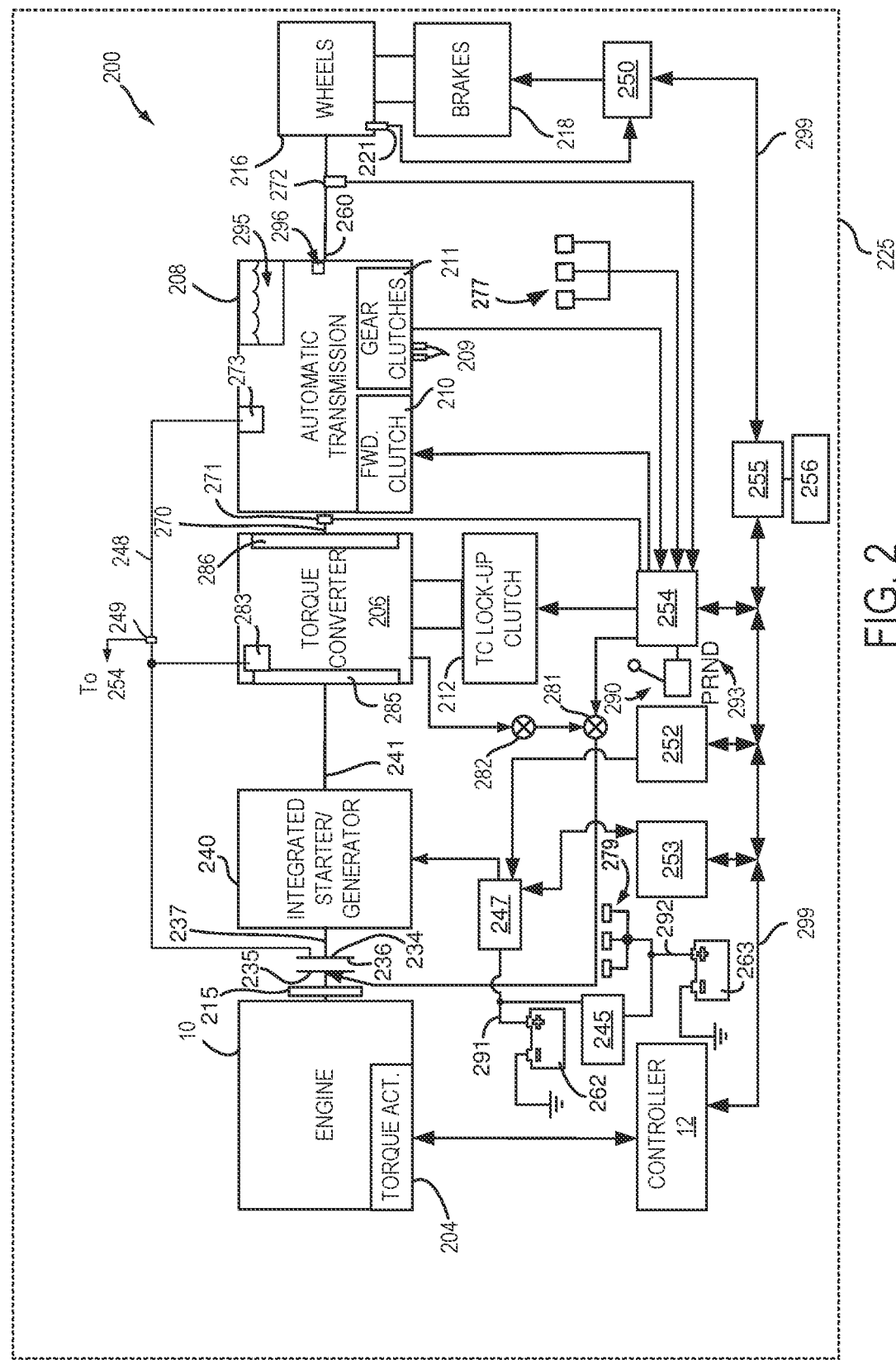
FIG. 2 is a schematic diagram of a hybrid vehicle driveline including the engine of FIG. 1.
Figure 3:
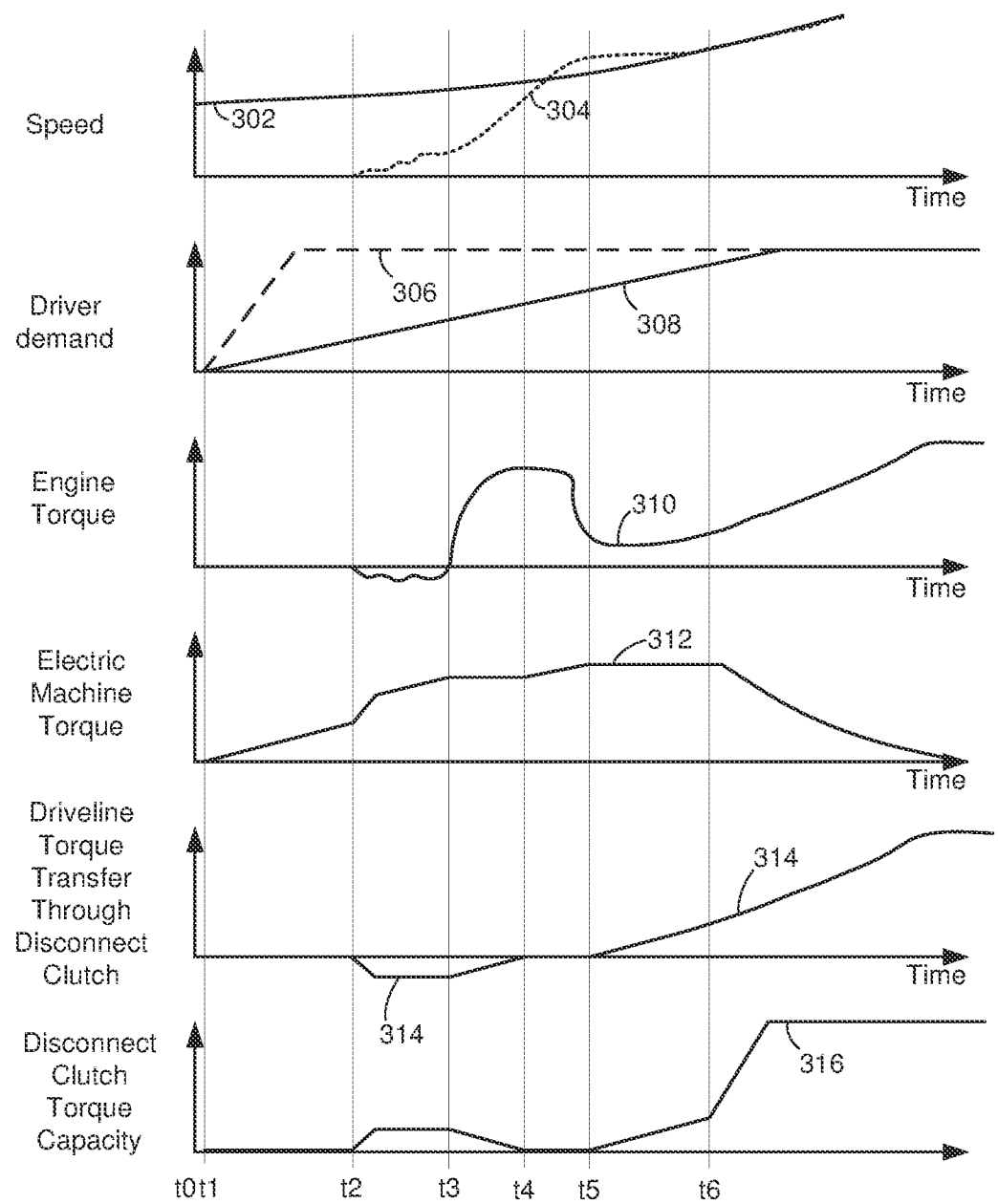
FIG. 3 shows example engine starting sequences according to the method of FIG. 4.
Figure 4:
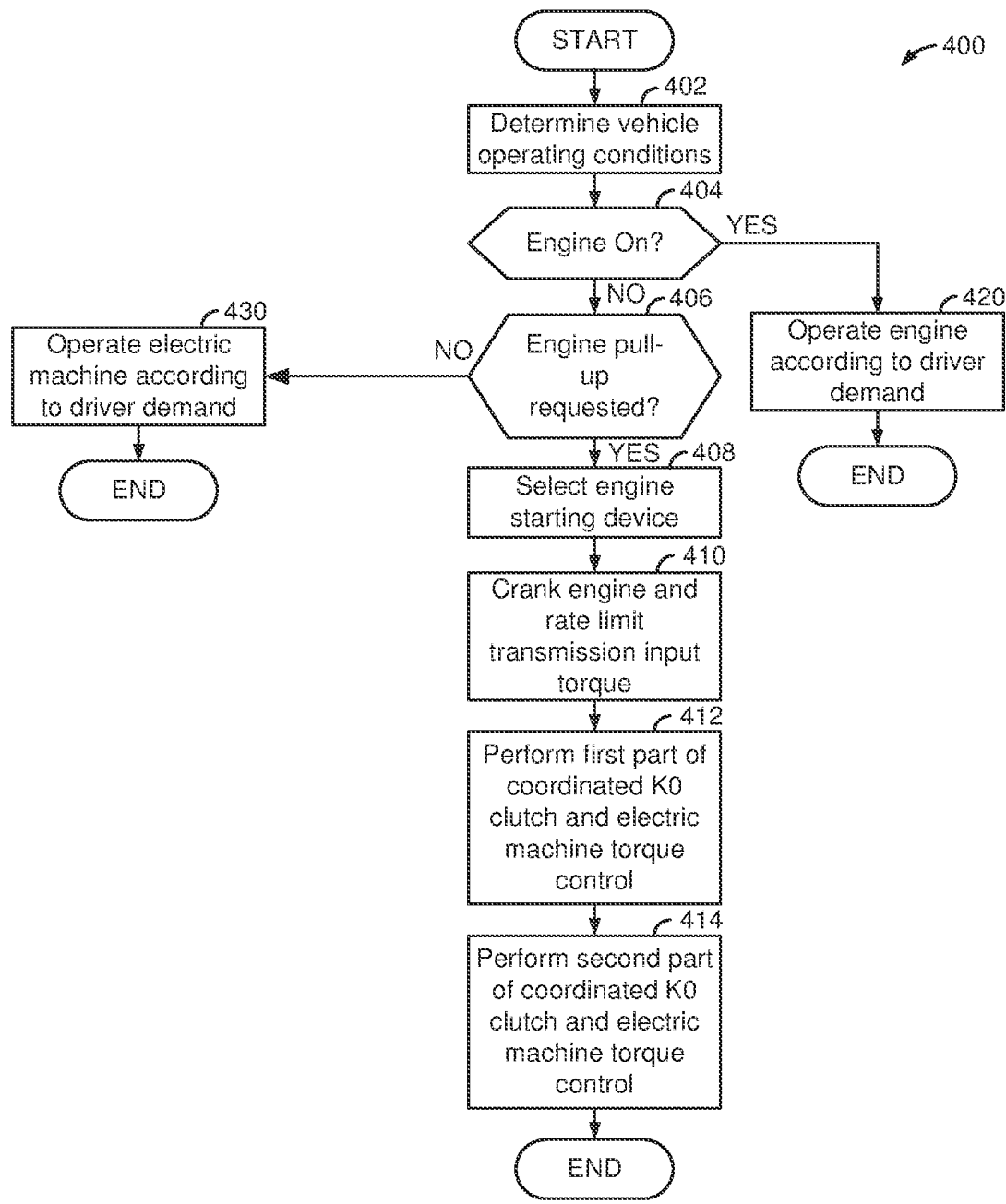
FIG. 4 shows a method for starting an engine of a hybrid vehicle.

The present description is related to improving starting of an engine of a hybrid vehicle. In particular, torque transfer capacity or torque capacity of a driveline disconnect clutch is coordinated with torque control of an electric machine (e.g., an integrated starter/generator) so that a possibility of driveline torque disturbances may be reduced. The coordinated torque control may be implemented whether the engine is started via a conventional starter or via a driveline disconnect clutch and the electric machine. The driveline may include an engine of the type that is shown in FIG. 1. The engine may be part of a hybrid powertrain or driveline as shown in FIG. 2. An operating sequence according to the methods of FIG. 4 is shown in FIG. 3. FIG. 4 shows a flowchart of a method for controlling a driveline.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples. FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line or conduit 248 may receive transmission fluid 295 from electric transmission fluid pump 273 and/or pump 283. Pressure in conduit 248 may be sensed via pressure sensor 249.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; and a controller including executable instructions stored in non-transitory memory that cause the controller to begin closing the disconnect clutch and increase a torque capacity of the disconnect clutch in response to the integrated starter/generator reaching its maximum torque output for a first time following an engine start. In a first example, the system includes where the torque capacity of the disconnect clutch is increased at a rate that is based on preventing driveline torque disturbances. In a second example that may include the first example, the system further comprises additional instructions to equalize an internal combustion engine speed with an integrated starter/generator speed. In a third example that may include one or both of the first and second examples, the system further comprises additional instructions to equalize an internal combustion engine torque with the torque capacity of the disconnect clutch. In a fourth example that may include one or more of the first through third examples, the system further comprises additional instructions to fully close the driveline disconnect clutch in response to the internal combustion engine torque being substantially equal to the integrated starter/generator. In a fifth example that may include one or more of the first through fourth examples, the system further comprises additional instructions to crank the internal combustion engine via increasing a torque transfer capacity of the disconnect clutch and increasing a torque output of the integrated starter/generator as the torque transfer capacity of the disconnect clutch is increased.

Referring now to FIG. 3, a prophetic driveline operating sequence is shown. The operating sequence of FIG. 3 may be provided via the system of FIGS. 1 and 2 in cooperation with the method of FIG. 4. The vertical lines at times t0-t6 represent times of interest during the operating sequence. The plots are time aligned.

The first plot from the top of FIG. 3 is a plot of speed versus time. The vertical axis represents speed and speed increases in the direction of the vertical axis arrow. The horizontal axis represents time and time increases from the left side of the plot to the right side of the plot. Trace 302 represents the integrated starter/generator speed and/or the speed of the torque converter impeller. Trace 304 represents engine speed The second plot from the top of FIG. 3 is a plot of torque versus time. The vertical axis represents torque and torque increases in the direction of the vertical axis arrow. The horizontal axis represents time and time increases from the left side of the plot to the right side of the plot. Trace 306 represents driver demand torque. Trace 308 represents rate limited or constrained driver demand torque (e.g., a driver demand torque that is restricted to increasing at a rate that is less than a threshold rate, such as 5 Newton-meters/second).

The third plot from the top of FIG. 3 is a plot of engine torque versus time. The vertical axis represents engine torque and engine torque increases in the direction of the vertical axis arrow. The horizontal axis represents time and time increases from the left side of the plot to the right side of the plot. Trace 310 represents engine torque.

The fourth plot from the top of FIG. 3 is a plot of electric machine (e.g., torque output of electric machine 240) torque versus time. The vertical axis represents the electric machine torque and electric machine torque increases in the direction of the vertical axis arrow. The horizontal axis represents time and time increases from the left side of the plot to the right side of the plot. Trace 312 represents the electric machine torque.

The fifth plot from the top of FIG. 3 is a plot of an amount of torque being transferred through a driveline disconnect clutch versus time. The vertical axis represents the amount of torque being transferred through a driveline disconnect clutch and the amount of torque being transferred through a driveline disconnect clutch increases in the direction of the vertical axis arrow. The horizontal axis is where the amount of torque being transferred through a driveline disconnect clutch is zero. The amount of torque being transferred through a driveline disconnect clutch driveline disconnect clutch state is negative (e.g., the driveline is transferring torque to the engine) when trace 314 is below the horizontal axis. The amount of torque being transferred through a driveline disconnect clutch driveline disconnect clutch state is positive (e.g., the driveline is receiving torque to the engine) when trace 314 is above the horizontal axis. The horizontal axis represents time and time increases from the left side of the plot to the right side of the plot. Trace 314 represents the amount of torque being transferred through a driveline disconnect clutch.

The sixth plot from the top of FIG. 3 is a plot of a driveline disconnect clutch torque capacity (e.g., an amount of torque that may be transferred from one side of the driveline disconnect clutch to the other side of the driveline disconnect clutch) torque versus time. The vertical axis represents driveline disconnect clutch torque capacity and the driveline disconnect clutch torque capacity increases in the direction of the vertical axis arrow. The horizontal axis represents time and time increases from the left side of the plot to the right side of the plot. Trace 316 represents the driveline disconnect clutch torque capacity.

At time t0, the engine is not started and the electric machine is not providing torque to the driveline. The electric machine is rotating as the vehicle (not shown) is coasting. The driver demand torque is zero and the rate limited driver demand torque is zero. The amount of torque that is transferred through the driveline disconnect clutch is zero and the driveline disconnect clutch torque capacity is zero.

At time t1, the driver demand torque begins increasing to follow a torque request from the vehicle operator (not shown). The rate limited driver demand torque begins increasing, but it increases at a slower rate than the driver demand torque. The engine torque remains zero and the electric machine torque begins to increase. The electric machine provides the rate limited driver demand torque. The amount of torque that is transferred through the driveline disconnect clutch is zero and the driveline disconnect clutch torque capacity is zero. The rate limited driver demand torque may reduce a possibility of driveline torque disturbances by constraining the rate that torque may be input to the vehicle's transmission.

At time t2, the electric machine speed and the torque converter impeller speed has increased as the electric machine torque is increased to provide the rate limited amount of driver demand torque. An engine pull-up is requested so that the engine may be started (not shown). The driver demand torque has leveled off, but the rate limited drive demand torque continues to increase in order to follow the driver demand torque. The driveline disconnect clutch torque capacity is increased so that torque may be transferred from the electric machine to the engine. The electric machine torque begins to increase to compensate for the electric machine torque that is transferred to the engine and to provide the driver demand torque. The amount of torque that is transferred through the driveline disconnect clutch begins to increase.

Between time t2 and time t3, the engine speed increases and the torque converter impeller speed continues increasing. The driver demand torque remains at a higher level and the rate limited driver demand torque continues to increase. The engine torque is negative since the engine is rotated via the electric machine and the driveline disconnect clutch. The torque capacity of the driveline disconnect clutch is increased and it levels off at a torque amount that is sufficient to crank the engine. The electric machine torque is increased to meet the torque that is delivered to the engine via the driveline disconnect clutch and to meet the driver demand torque. The torque that is transferred through the driveline disconnect clutch is a negative value since the driveline disconnect clutch is delivering torque from the driveline to the engine.

At time t3, combustion begins in the engine and the engine speed begins to increase. The electric machine torque is held or maintained at a substantially constant value (e.g., the electric machine torque is commanded to vary less than ±5% from a desired or requested torque) in response to combustion of air and fuel being detected within the engine, the substantially constant torque is a torque output by the electric machine when combustion in the engine was most recently indicated by a change in engine speed. In addition, the torque transfer capacity of the driveline disconnect clutch is decreased at less than a threshold rate of change in response to combustion of air and fuel being detected within the engine. The amount of torque that is transferred through the driveline disconnect clutch increases from a negative value toward zero as the torque transfer capacity of the driveline disconnect clutch is reduced. By reducing the torque transfer capacity of the driveline disconnect clutch and maintaining the electric machine torque at a constant value, the electric machine provides the torque to meet the increasing rate limited driver demand torque. In addition, the rate limited driver demand torque may reduce a possibility of driveline torque disturbances since driveline torque evolves at a controlled rate.

At time t4, the electric machine torque begins to increase in response to the driveline disconnect clutch torque capacity being reduced to zero. The engine speed continues to increase and the torque converter impeller speed continues to increase. The driver demand torque remains at its previous level and the rate limited driver demand torque continues to increase in an effort to match the driver demand torque. The engine torque begins to level off and torque transferred through the driveline disconnect clutch is zero.

At time t5, the electric machine torque reaches a maximum torque for the electric machine at the present speed of the electric machine. The driveline disconnect clutch begins to close in response to the electric machine reaching its maximum torque so that the engine may begin transferring torque so that the driveline torque may meet the rate limited driver demand torque. The driveline disconnect clutch torque capacity rate of increase is limited or constrained to increase at a rate that is less than a threshold rate so that a possibility of driveline torque disturbances may be reduced while closing the driveline disconnect clutch. Additionally, the engine speed is adjusted to the speed of the electric machine or the torque converter impeller speed via adjusting engine torque. The driver demand torque is unchanged and the rate limited driver demand torque continues to increase in an effort to meet the driver demand torque. The electric machine torque remains at its maximum value at the present electric machine speed and torque transfer through the driveline disconnect clutch by the engine begins to increase.

At time t6, the engine speed is equal to the speed of the electric machine so the driveline disconnect clutch is commanded to fully close. The rate limited driver demand torque is closed to meeting the driver demand torque. The electric machine torque is reduced shortly after time t6 as engine torque is delivered to the driveline via closing the driveline disconnect clutch. The amount of torque that is delivered through the disconnect clutch continues to increase.

In this way, a rate limited driver demand torque may be met to reduce a possibility of driveline torque disturbances. The rate limited driver demand torque may be met by rate limiting torque capacity of the driveline disconnect clutch and operating an electric machine to output a substantially constant amount of torque.

Referring now to FIG. 4, a method for operating an engine of a hybrid vehicle is shown. The method of FIG. 4 may be at least partially implemented as executable instructions stored in memory of one or more controllers in the system of FIGS. 1 and 2. Further, the method of FIG. 4 may include actions taken in the physical world by a controller to transform an operating state of the system of FIGS. 1 and 2. Additionally, the method of FIG. 4 may provide at least portions of the operating sequence shown in FIG. 3.

At 402, method 400 determines vehicle operating conditions. Vehicle operating conditions may include but are not limited to vehicle speed, driver demand torque or power, engine temperature, integrated starter/generator speed and torque, engine speed, and state of battery charge. Method 400 proceeds to 404.

At 404, method 400 judges whether the internal combustion engine is on (e.g., rotating and combusting fuel). If so, the answer is yes and method 400 proceeds to 420. Otherwise, the answer is no and method 400 proceeds to 406.

At 420, method 400 operates the engine according to driver demand torque/power and state of battery charge. In one example, method 400 may request engine torque/power and electric machine torque/power as a function of driver demand torque/power and battery state of charge. Method 400 proceeds to exit.

At 406, method 400 judges whether or not an engine pull-up is requested. An engine pull-up may be requested in response to a driver demand torque or power request that is generated via a driver applying the driver demand pedal, battery state of charge being less than a threshold charge amount, an emission system temperature, a level of stored fuel vapor, and other vehicle operating conditions. If method 400 judges that an engine pull-up is requested, the answer is yes and method 400 proceeds to 408. Otherwise, the answer is no and method 400 proceeds to 430.

At 430, method 400 operates the electric machine according to driver demand torque/power. In one example, method 400 may request electric machine torque/power as a function of driver demand torque/power and vehicle speed. Method 400 proceeds to exit.

At 408, method 400 selects an electric machine for assisting starting of the engine. In one example, method 400 may reference a table or matrix according to vehicle operating conditions (e.g., vehicle drive mode, battery state of charge, vehicle speed, etc.) and the table or matrix outputs an electric machine that is to be applied to pull-up and start the engine. Method 400 proceeds to 410 after the engine starting device is selected.

At 410, method 400 cranks the engine (e.g., rotates the engine under power of an electric machine) via the selected electric machine and rate limits the amount of torque that may be input to the transmission. Method 400 may crank the engine via the flywheel starter 96 or via the electric machine (e.g., 240 of FIG. 2) and the driveline disconnect clutch. If method 400 is cranking the engine via the driveline disconnect clutch, method 400 increases the driveline disconnect clutch capacity at a fixed rate until the driveline disconnect clutch capacity reaches a desired or requested capacity, which may be a substantially constant value (e.g., a requested torque capacity that changes by less than ±5% of the requested value). Increasing the driveline disconnect clutch torque capacity causes the torque that is transferred through the driveline disconnect clutch to move negative as shown at time t2 in FIG. 3. The engine is rotated via holding the driveline disconnect clutch torque capacity substantially constant (e.g., within ±5% of a requested or desired value). The engine is supplied with spark and fuel while the engine is cranked. The electric machine torque is adjusted to meet the sum of the rate limited driver demand torque and the torque that is transferred to crank the engine. Thus, the torque output of the electric machine may be increased so that the driveline torque may follow the rate limited driver demand torque.

Method 400 also constrains or limits the rate of torque change into the transmission via the electric machine and/or engine as shown in FIG. 3. Method 400 may rate limit or constrain the torque that is input to the transmission to be less than a threshold rate of torque change (e.g., less than 5 Newton-meters/second) so that a possibility of driveline torque disturbances may be reduced. In one example, method 500 may limit the rate of torque increase into the transmission by rate limiting current flow to the electric machine (e.g., electric machine 240 in FIG. 2). Alternatively, or in addition, method 500 may limit the rate of torque increase by the engine via rate limiting changes in throttle position, spark timing, cam timing, etc. Further, method 400 may rate limit the rate of torque input to the transmission via rate limiting a torque capacity of the driveline disconnect clutch (e.g., the torque capacity rate of increase for the driveline disconnect clutch may be limited or constrained to be less than 4 Newton-meters/second). Rate of change in engine torque output, driveline disconnect clutch torque capacity, and electric machine torque output may be performed individually on the engine, electric machine, and driveline disconnect clutch. Alternatively, rate of change in engine torque output, driveline disconnect clutch torque capacity, and electric machine torque output simultaneously. Method 400 proceeds to 412.

At 412, method 400 performs a first part or phase of coordinating driveline disconnect clutch (e.g., K0 clutch) torque and electric machine (e.g., 240 of FIG. 2) torque control. In one example, the first part or phase may include one or more of the actions described herein.

In response to combustion being detected in the engine and engine speed being less than torque converter turbine speed, an amount of torque that may be transferred through the driveline disconnect clutch is increased by a rate limited amount via decreasing the driveline disconnect clutch torque capacity. Thus, the amount of torque that is transferred through the driveline disconnect clutch may be increased from a more negative value to a less negative value or zero as shown beginning at time t3 in FIG. 3. The driveline disconnect clutch torque capacity may be reduced at a rate that causes the driveline to deliver the rate limited driver demand torque. The driveline disconnect clutch torque capacity is decreased to a desired or requested level (e.g., 0 or less than 1 Newton-meter) so that increases in driveline torque that may occur when engine speed exceeds torque converter impeller speed may be maintained at a desired level (e.g., the rate limited driver demand torque). The engine torque may also be increased as the engine runs up to increase engine speed. In addition, the electric machine is operated at a substantially constant torque (e.g., a torque command value that changes by less than ±5 percent of a nominally commanded value. For example, electric machine torque is 100 Newton meters when combustion is first detected in the engine after a most recent engine run-up and or engine start request, the electric machine command may range from 97.5 Newton-meters to 102.5 Newton-meters. Once the driveline disconnect clutch torque capacity is at a requested or desired level, the electric machine torque is increased as shown at time t4 of FIG. 3. In some examples, the torque output of the electric machine may be increased in response to the rate limited driver demand torque being equal to or exceeding the substantially constant electric machine torque. The rate that the electric machine torque is increased is rate limited to be less than a threshold level (e.g., the electric machine rate of torque increase is constrained to be less than 5 Newton-meters/second). Method 400 proceeds to 414.

At 414, method 400 performs a second part or phase of coordinating driveline disconnect clutch (e.g., K0 clutch) torque and electric machine (e.g., 240 of FIG. 2) torque control. In one example, the second part or phase may include one or more of the actions described herein.

Once torque output of the electric machine is the maximum torque output for the electric machine at the present speed of the electric machine, the torque capacity of the driveline disconnect clutch is increased. The rate that the electric machine torque is increased is rate limited to be less than a threshold level (e.g., the electric machine rate of torque increase is constrained to be less than 5 Newton-meters/second). By rate limiting the increase in driveline disconnect clutch torque capacity, it may be possible to reduce the possibility of driveline torque disturbances and prevent jerk. Additionally, the engine may be operated in a speed control mode where engine torque is adjusted to control engine speed to the speed of the torque converter impeller. Once the engine speed is substantially equivalent (e.g., speeds are within ±5% of each other) to torque converter impeller speed, engine torque may be adjusted substantially equal (e.g., torques are within ±5% of each other) to the torque capacity of the driveline disconnect clutch. The driveline disconnect clutch may be commanded fully closed in response to the engine torque being within a threshold torque of the driveline disconnect clutch torque capacity. The engine torque is increased to the level of the driver demand torque and the electric machine torque is reduced to zero as the engine torque approaches the driver demand torque as shown in FIG. 3 after time t5.

In this way, torque of a driveline disconnect clutch may be coordinated with torque of an electric machine to reduce a possibility of driveline torque disturbances during engine starting. The rate limited driveline disconnect clutch torque capacity control permits slip if driveline torque exceeds driver demand and it permits the driveline to meet driver demand so that the driveline may respond as desired.

Thus, method 400 may select an engine starting device in response to an engine start request. If the driver demand pedal is not applied, the engine may be started via closing a driveline disconnect clutch. However, if the driver demand pedal is applied, the engine may be started via a flywheel starter. If pressure in a line supplying transmission fluid to a driveline disconnect clutch reaches a threshold pressure before the driver demand pedal is applied, the driveline disconnect clutch may be closed to start the engine. Because the line pressure is high, the torque that is delivered to the engine via the driveline disconnect clutch and an electric machine may be more repeatable.

The method of FIG. 4 provides for a method for operating a vehicle, comprising: via one or more controllers, generating a rate limited driver demand torque in response to an engine start request; cranking an engine via increasing a torque transfer capacity of a driveline disconnect clutch and increasing a torque output of an electric machine as the torque transfer capacity of the driveline disconnect clutch is increased; and decreasing the torque transfer capacity of the driveline disconnect clutch and outputting a substantially constant torque via the electric machine in response to an indication of combustion occurring in the engine. In a first example, the method further comprises increasing torque output of the electric machine in response to the rate limited driver demand torque being equal to or exceeding the substantially constant torque. In a second example that may include the first example, the method further comprises increasing speed of the engine via increasing engine torque while decreasing the torque transfer capacity of the driveline disconnect clutch. In a third example that may include one or both of the first and second examples, the method further comprises increasing torque output of the electric machine such that the electric machine reaches its maximum torque output. In a fourth example that may include one or more of the first through third examples, the method includes where the driveline disconnect clutch is positioned in a driveline between the engine and the electric machine. In a fifth example that may include one or more of the first through fourth examples, the method further comprises operating the driveline disconnect clutch with a substantially constant torque capacity while cranking the engine after increasing the torque transfer capacity of the driveline disconnect clutch during cranking the engine. In a sixth example that may include one or more of the first through fifth examples, the method further comprises increasing the torque output of the electric machine constant while cranking the engine and operating the driveline disconnect clutch with the substantially constant torque capacity. In a seventh example that may include one or more of the first through sixth examples, the method includes where the torque output of the electric machine equals a sum of the rate limited driver demand torque and the substantially constant torque capacity of the driveline disconnect clutch. In a eighth example that may include one or more of the first through seventh examples, the method includes where the indication of combustion occurring in the engine is a change in engine speed.

The method of FIG. 4 also provides for a method for operating a vehicle, comprising: via one or more controllers, generating a rate limited driver demand torque in response to an engine start request; cranking an engine via increasing a torque transfer capacity of a driveline disconnect clutch and increasing a torque output of an electric machine as the torque transfer capacity of the driveline disconnect clutch is increased; decreasing the torque transfer capacity of the driveline disconnect clutch and outputting a substantially constant torque via the electric machine in response to an indication of combustion occurring in the engine; increasing torque output of the electric machine in response to the torque transfer capacity of the driveline disconnect clutch being substantially zero; and increasing the torque transfer capacity of the driveline disconnect clutch in response to the torque output of the electric machine reaching a maximum torque output of the electric machine. In a first example, the method further comprises substantially equalizing a speed of the engine and a speed of the electric machine. In a second example that may include the first example, the method further comprises equalizing torque output of the engine and the torque transfer capacity of the driveline disconnect clutch in response to the speed of the engine and the speed of the electric machine being substantially equalized. In a third example that may include one or both of the first and second examples, the method further comprises fully closing the driveline disconnect clutch in response to substantially equalizing torque output of the engine and torque transfer capacity of the driveline disconnect clutch. In a fourth example that may include one or more of the first through third examples, the method further comprises increasing torque output of the electric machine in response to the rate limited driver demand torque being equal to or exceeding the constant torque.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via one or more controllers, generating a rate limited driver demand torque in response to an engine start request;
cranking an engine via increasing a torque transfer capacity of a driveline disconnect clutch and increasing a torque output of an electric machine as the torque transfer capacity of the driveline disconnect clutch is increased; and
decreasing the torque transfer capacity of the driveline disconnect clutch and outputting a substantially constant torque via the electric machine in response to an indication of combustion occurring in the engine.

2. The method of claim 1, further comprising increasing torque output of the electric machine in response to the rate limited driver demand torque being equal to or exceeding the substantially constant torque.

3. The method of claim 1, further comprising increasing speed of the engine via increasing engine torque while decreasing the torque transfer capacity of the driveline disconnect clutch.

4. The method of claim 3, further comprising increasing torque output of the electric machine such that the electric machine reaches its maximum torque output.

5. The method of claim 1, where the driveline disconnect clutch is positioned in a driveline between the engine and the electric machine.

6. The method of claim 1, further comprising operating the driveline disconnect clutch with a substantially constant torque capacity while cranking the engine after increasing the torque transfer capacity of the driveline disconnect clutch during cranking the engine.

7. The method of claim 6, further comprising increasing the torque output of the electric machine constant while cranking the engine and operating the driveline disconnect clutch with the substantially constant torque capacity.

8. The method of claim 7, where the torque output of the electric machine equals a sum of the rate limited driver demand torque and the substantially constant torque capacity of the driveline disconnect clutch.

9. The method of claim 1, where the indication of combustion occurring in the engine is a change in engine speed.

10. A system, comprising:
an internal combustion engine;
an integrated starter/generator;
a disconnect clutch positioned in a driveline between the internal combustion engine and the integrated starter/generator;
a transmission included in the driveline; and
a controller including executable instructions stored in non-transitory memory that cause the controller to begin closing the disconnect clutch and increase a torque capacity of the disconnect clutch in response to the integrated starter/generator reaching its maximum torque output for a first time following an engine start.

11. The system of claim 10, where the torque capacity of the disconnect clutch is increased at a rate that is based on preventing driveline torque disturbances.

12. The system of claim 11, further comprising additional instructions to equalize an internal combustion engine speed with an integrated starter/generator speed.

13. The system of claim 12, further comprising additional instructions to equalize an internal combustion engine torque with the torque capacity of the disconnect clutch.

14. The system of claim 13, further comprising additional instructions to fully close the disconnect clutch in response to the internal combustion engine torque being substantially equal to the integrated starter/generator.

15. The system of claim 10, further comprising additional instructions to crank the internal combustion engine via increasing a torque transfer capacity of the disconnect clutch and increasing a torque output of the integrated starter/generator as the torque transfer capacity of the disconnect clutch is increased.

16. A method for operating a vehicle, comprising:
via one or more controllers, generating a rate limited driver demand torque in response to an engine start request;
cranking an engine via increasing a torque transfer capacity of a driveline disconnect clutch and increasing a torque output of an electric machine as the torque transfer capacity of the driveline disconnect clutch is increased;
decreasing the torque transfer capacity of the driveline disconnect clutch and outputting a substantially constant torque via the electric machine in response to an indication of combustion occurring in the engine;
increasing torque output of the electric machine in response to the torque transfer capacity of the driveline disconnect clutch being substantially zero; and
increasing the torque transfer capacity of the driveline disconnect clutch in response to the torque output of the electric machine reaching a maximum torque output of the electric machine.

17. The method of claim 16, further comprising substantially equalizing engine speed and electric machine speed.

18. The method of claim 17, further comprising equalizing torque output of the engine and the torque transfer capacity of the driveline disconnect clutch in response to the speed of the engine and the speed of the electric machine being substantially equalized.

19. The method of claim 18, further comprising fully closing the driveline disconnect clutch in response to substantially equalizing torque output of the engine and torque transfer capacity of the driveline disconnect clutch.

20. The method of claim 16, further comprising increasing torque output of the electric machine in response to the rate limited driver demand torque being equal to or exceeding the substantially constant torque.

* * * * *